United States Patent
Iketani et al.

(10) Patent No.: US 7,686,454 B2
(45) Date of Patent: Mar. 30, 2010

(54) IMAGE COMBINING SYSTEM, IMAGE COMBINING METHOD, AND PROGRAM

(75) Inventors: Akihiko Iketani, Tokyo (JP); Noboru Nakajima, Tokyo (JP); Tomokazu Sato, Tokyo (JP); Sei Ikeda, Tokyo (JP); Masayuki Kanbara, Tokyo (JP); Naokazu Yokoya, Tokyo (JP)

(73) Assignee: NEC Corporation, Tokyo (JP)

( * ) Notice: Subject to any disclaimer, the term of this patent is extended or adjusted under 35 U.S.C. 154(b) by 1057 days.

(21) Appl. No.: 10/571,145

(22) PCT Filed: Sep. 7, 2004

(86) PCT No.: PCT/JP2004/012982

§ 371 (c)(1),
(2), (4) Date: Mar. 8, 2006

(87) PCT Pub. No.: WO2005/024723

PCT Pub. Date: Mar. 17, 2005

(65) Prior Publication Data

US 2007/0008499 A1    Jan. 11, 2007

(30) Foreign Application Priority Data

Sep. 8, 2003  (JP) ............................. 2003-315786

(51) Int. Cl.
*H04N 1/387*  (2006.01)
*G06K 9/36*  (2006.01)
*G06K 15/00*  (2006.01)

(52) U.S. Cl. ..................... 353/30; 345/1.3; 396/333; 382/284

(58) Field of Classification Search .................. 353/30, 353/94; 345/1.3, 630, 903; 396/322, 333; 382/276, 284; 358/450
See application file for complete search history.

(56) References Cited

U.S. PATENT DOCUMENTS

| 5,982,951 A * | 11/1999 | Katayama et al. ............ 382/284 |
| 6,075,905 A * | 6/2000 | Herman et al. ............... 382/284 |
| 6,393,162 B1 * | 5/2002 | Higurashi .................... 382/284 |
| 6,434,280 B1 * | 8/2002 | Peleg et al. .................. 382/299 |
| 7,064,783 B2 * | 6/2006 | Colavin et al. ............ 348/231.3 |
| 7,308,028 B2 * | 12/2007 | Suh ........................ 375/240.12 |
| 7,317,558 B2 * | 1/2008 | Chiba ......................... 358/450 |

FOREIGN PATENT DOCUMENTS

JP    02-178646    7/1990

(Continued)

OTHER PUBLICATIONS

Irani, Michal, "Improving Resolution by Image Registration," Graphical Models and Image Processing, vol. 53, No. 3, p. 231-239, 1991.

(Continued)

*Primary Examiner*—William C Dowling
(74) *Attorney, Agent, or Firm*—Scully, Scott, Murphy & Presser, P.C.

(57) ABSTRACT

A data processing unit calculates image conversions parameters corresponding to each partial image, geometrically converts photographed partial images on the basis of a current partial image based on the calculated image conversion parameters, and combines them to generate a mosaic image. Also, a display device displays each current partial image, and at least part of the generated mosaic image.

24 Claims, 8 Drawing Sheets

FOREIGN PATENT DOCUMENTS

| | | |
|---|---|---|
| JP | 05-046718 | 2/1993 |
| JP | 05-260264 | 10/1993 |
| JP | 06-303561 | 10/1994 |
| JP | 09-289598 | 11/1997 |
| JP | 10-069537 | 3/1998 |
| JP | 10-164563 | 6/1998 |
| JP | 11-088767 | 3/1999 |
| JP | 2000-175186 | 6/2000 |
| JP | 2000-244814 | 9/2000 |
| JP | 2001-14444 | 1/2001 |
| JP | 2002-342754 | 11/2002 |
| WO | WO 98/21690 | 5/1998 |

OTHER PUBLICATIONS

Chiba, Naoki, et al., "Image Mosaicking Based on Image Features," Transaction Of Electronics, Information and Communication Engineers D-11, vol. J82-D-11, No. 10, pp. 1581-1589.

"Numerical Recipes in C {Japanese version} Numerical Calculation Recipes i n C language," pp. 503-507, Gijutsu-Hyoron Co., Ltd, ISBN4-87408-506-I.

Sato, Tomokazu, et al., "3D Reconstruction from a Monocular Image Sequence by Tracking Markers and Natural Features," with an English—language abstract.

Sato, Tomokazu, et al., "3D Modeling of an Outdoor Scene from Molecular Image Sequence by Multi-Baseline Stereo," with an English—language abstract.

* cited by examiner

[Fig. 1]
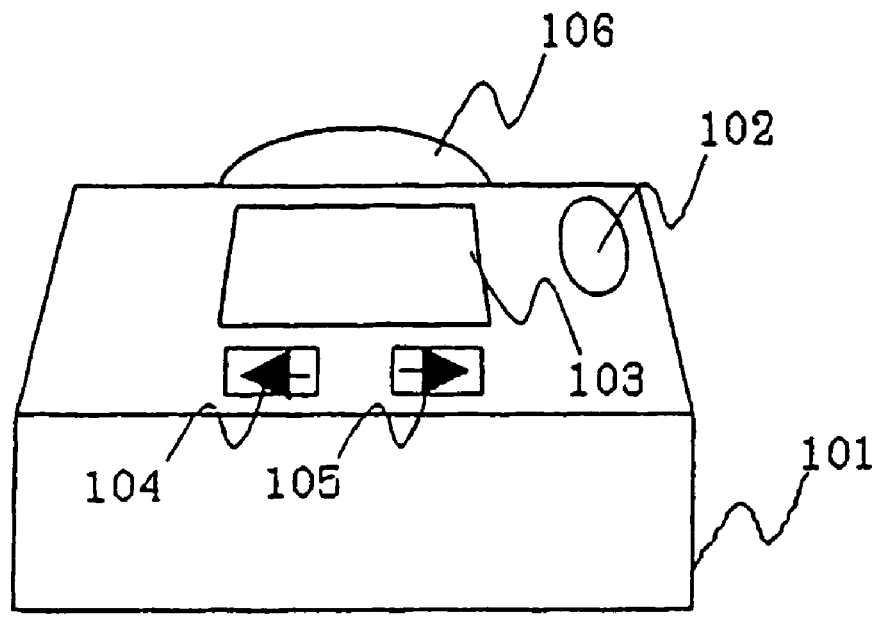
[Fig. 2]
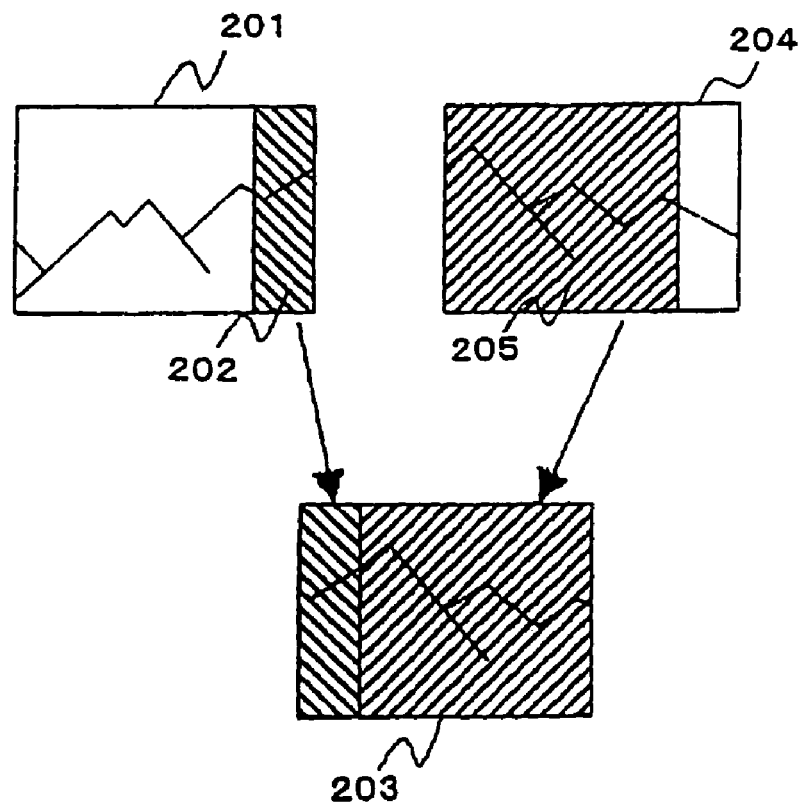

[Fig. 3]
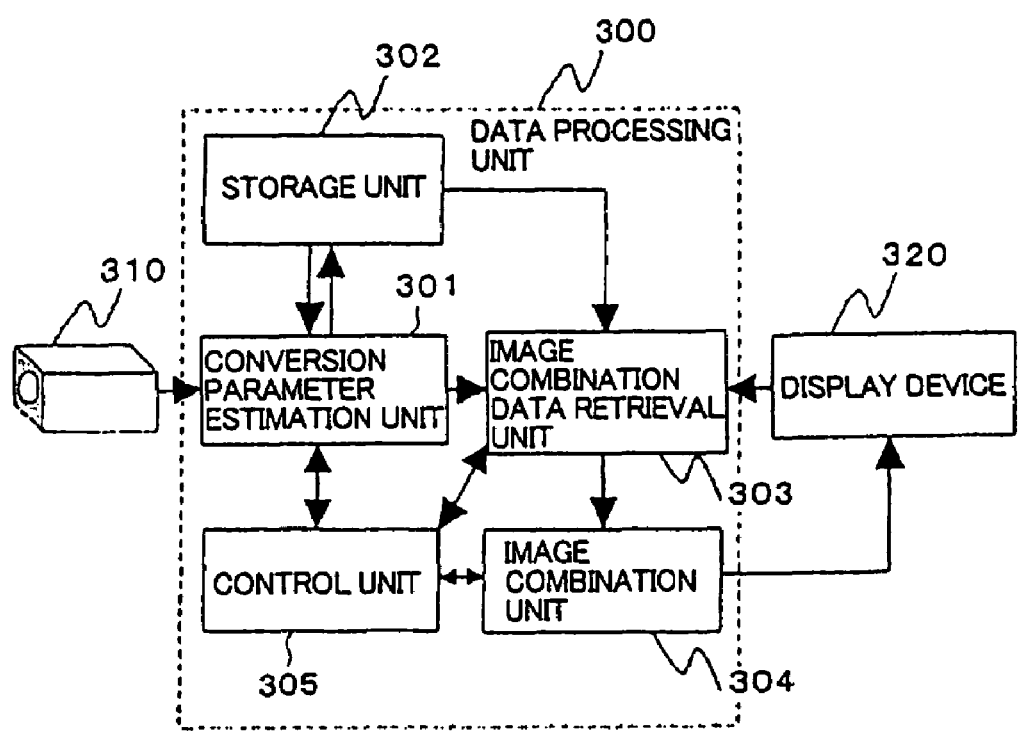

[Fig. 4]
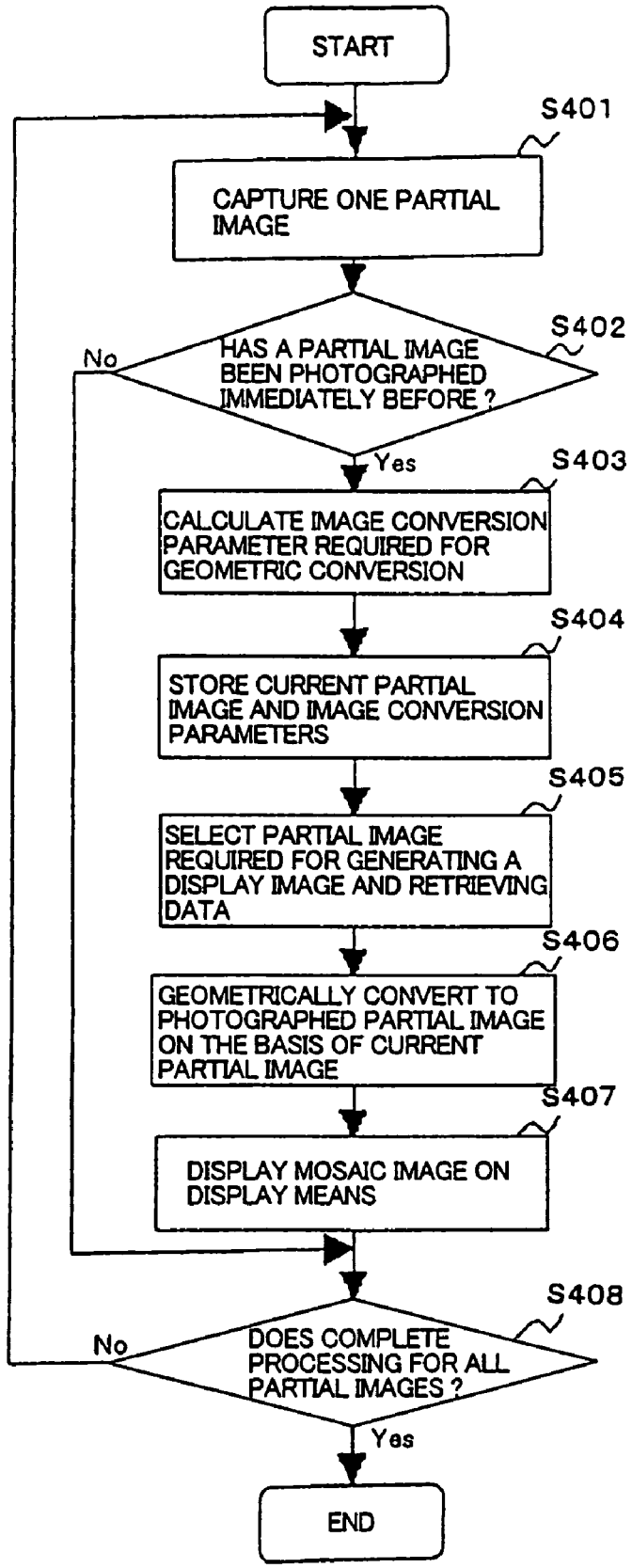

[Fig. 5]
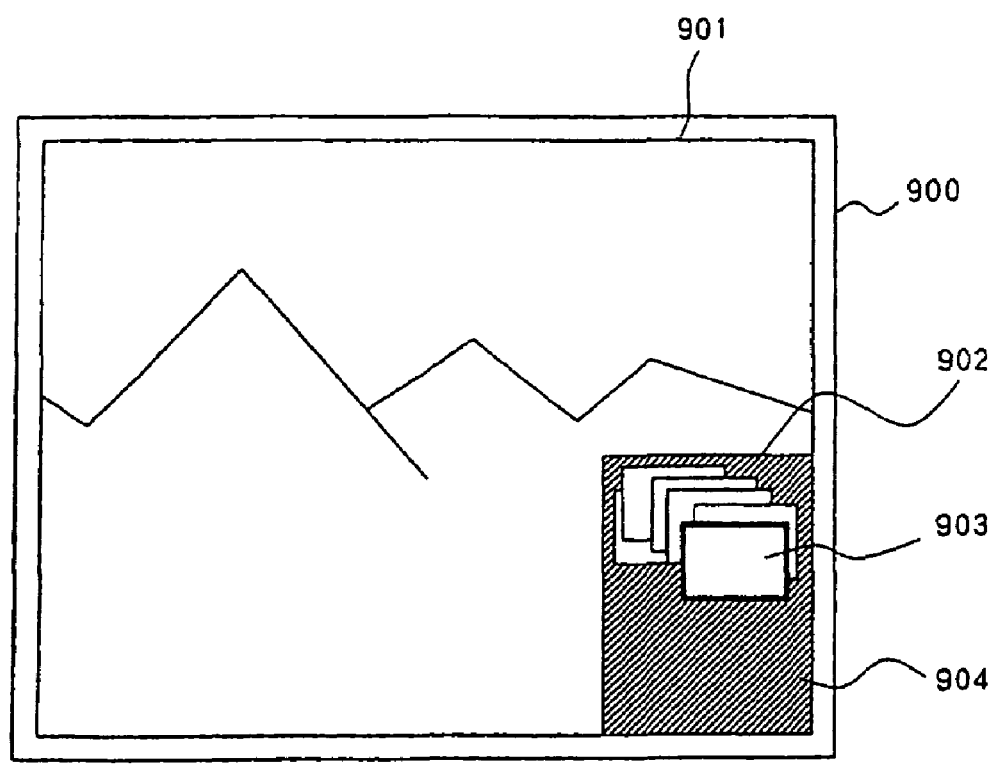

[Fig. 6]
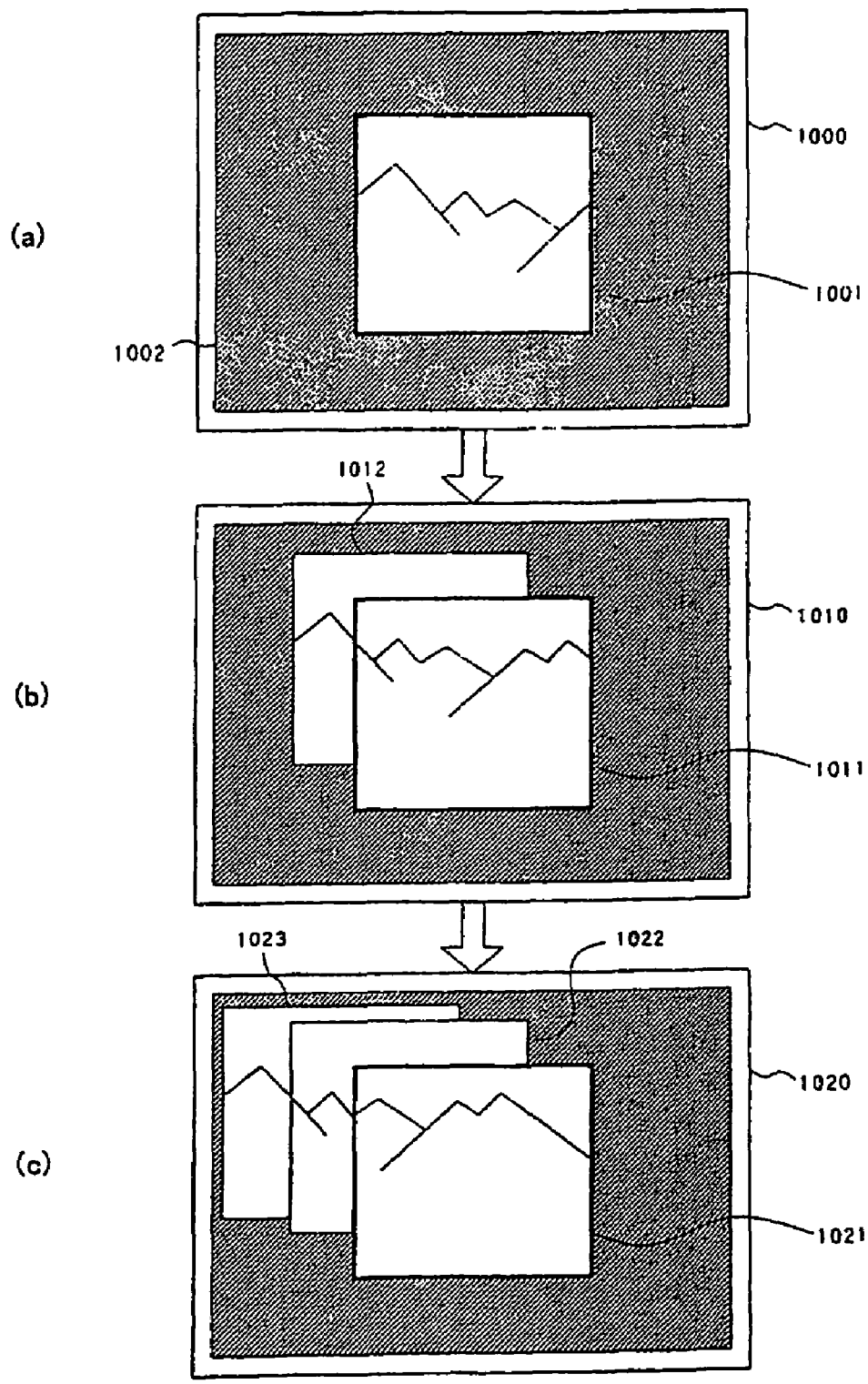

[Fig. 7]
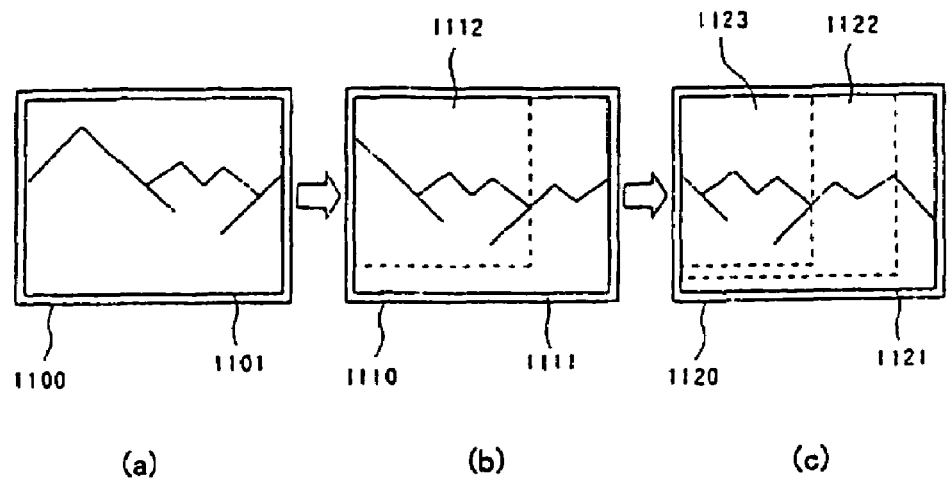
(a)        (b)        (c)
[Fig. 8]
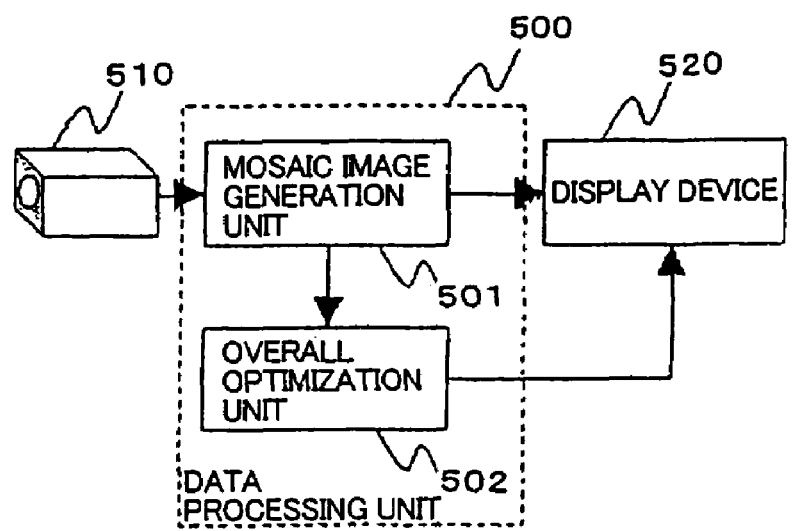

[Fig. 9]
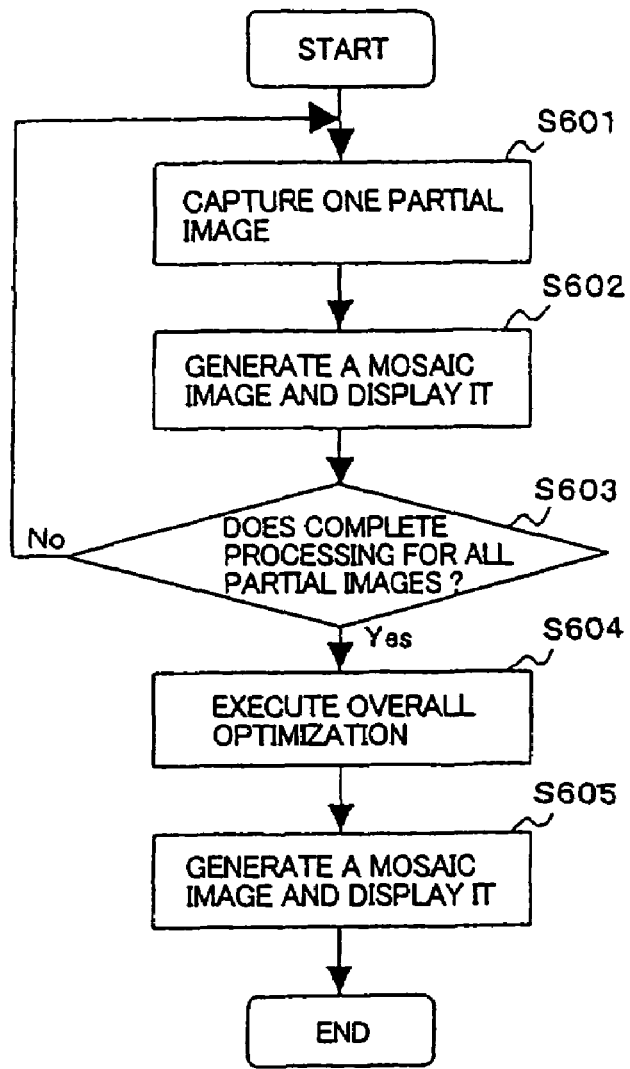
[Fig. 10]
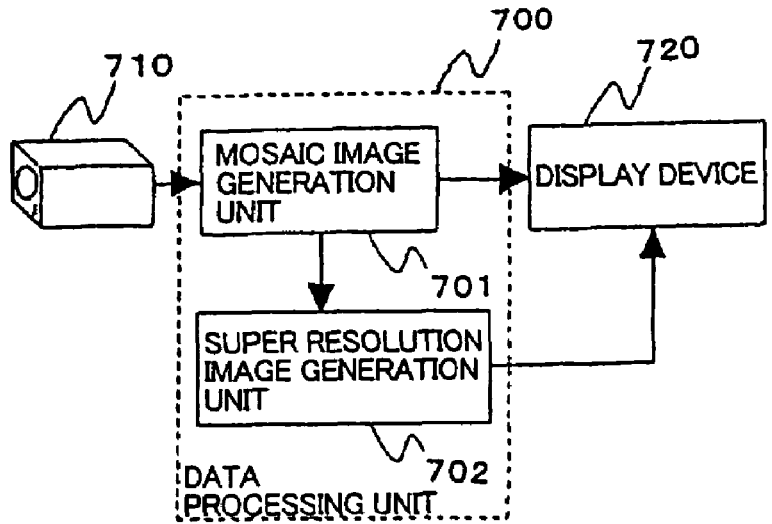

[Fig. 11]
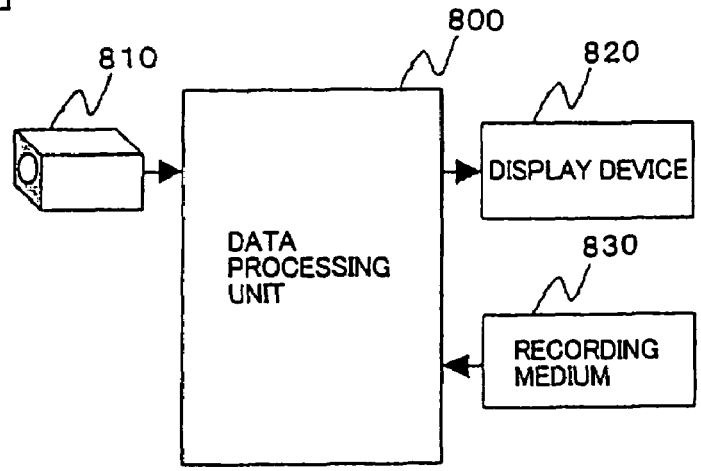
[Fig. 12]
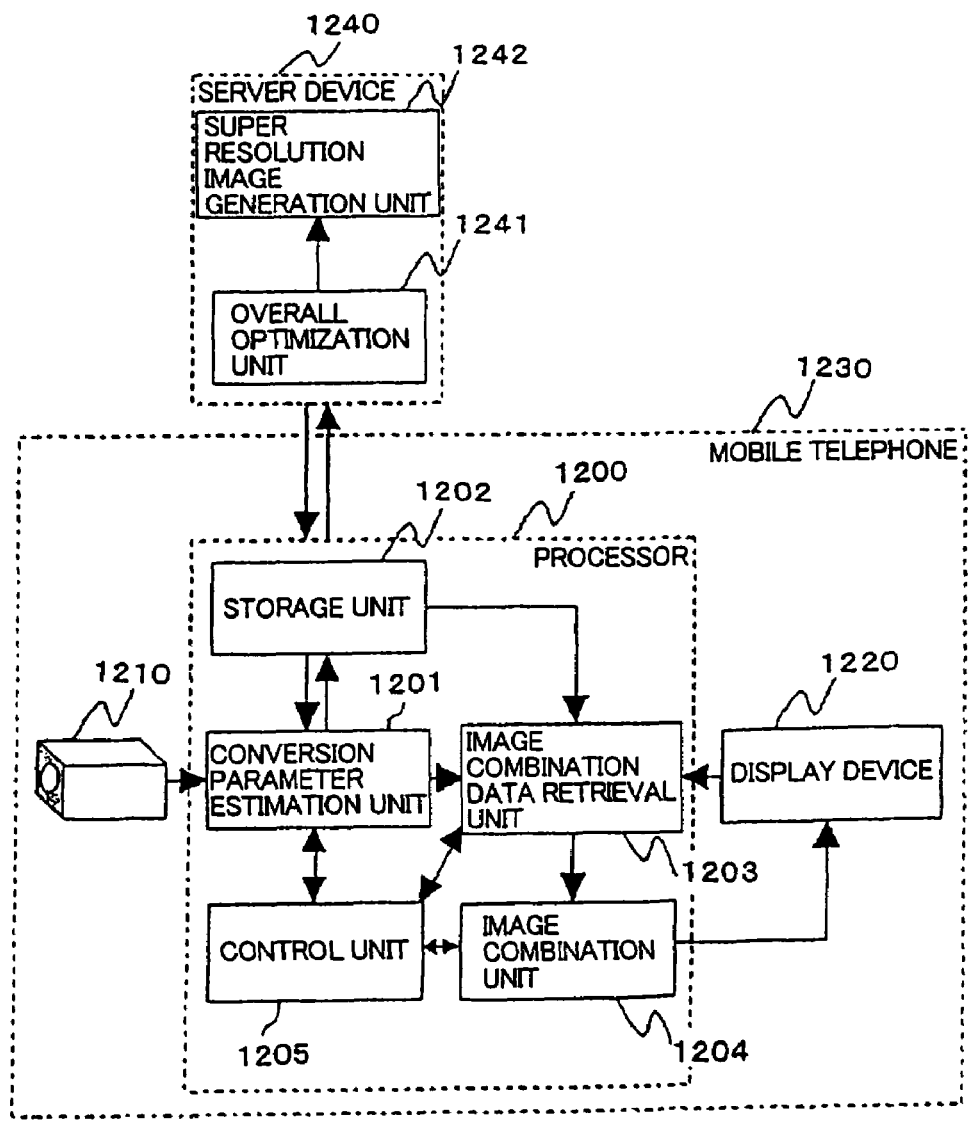

IMAGE COMBINING SYSTEM, IMAGE COMBINING METHOD, AND PROGRAM

TECHNICAL FIELD

The present invention relates to an image combining system, an image combining method, and an image combination program for dividing a subject into a plurality of partial images, photographing the divided partial images, and combining these partial images to generate an image having a wider viewing angle and a higher definition.

BACKGROUND ART

Conventionally, image combining approaches have been known for dividing a subject into a plurality of partial images which are photographed, and combining the partial images with one another with estimation of a positional relationship among the respective partial images to generate an image called a mosaic image which has a wider viewing angle and a higher definition.

For example, Non-Patent Document 1 (Naoki Chiba, Hiroshi Kayano, Mitihiko Mino, Shouji Yasuda, "Image Mosaicking Based on Image Features," Transaction of The Institute of Electronics, Information and Communication Engineers D-II, Vol. J82-D-II, No. 10, pp.1581-1589) discloses a method of generating a mosaic image by estimating a positional relationship among respective partial images based on motion vectors within the partial images generated by an image analysis. Specifically, sites (corresponding points) which are similar in distribution of luminance value are found from two partial images which were photographed at nearest times, and image conversion parameters are calculated for making a geometrical conversion (movement, rotation, scaling up/down) such that all of them overlap each other. Then, one partial image is used as a basis to geometrically convert the other partial image using the calculated image conversion parameters to generate a mosaic image.

The following model, which supposes that a subject is a flat surface, is often used for the image conversion parameters because of its simplicity.

$$\begin{pmatrix} u_2 \\ v_2 \\ 1 \end{pmatrix} = \begin{pmatrix} a & b & c \\ d & e & f \\ g & h & 1 \end{pmatrix} \begin{pmatrix} u_1 \\ v_1 \\ 1 \end{pmatrix} \qquad \text{[Equation 1]}$$

where (u1, v1, 1), (u2, v2, 1) are homogeneous coordinates of respective corresponding points, a, b, c, d, e, f, g, h are image conversion parameters, and t is an arbitrary constant.

Also, for further simplifying the model, a restraint condition may be applied to the image conversion parameters, such as g=h=0, a=e=cos θ,−b=d=sin θ, and the like.

In the approach described in the aforementioned Non-Patent Document 1, a camera must be moved such that an overlapping portion exists between two partial images. Otherwise, no corresponding points would exist between the partial images, resulting in a failure in calculating the image conversion parameters. Also, if part of the subject is not photographed when the partial images are photographed, a mosaic image lacks the partial images, so that a user must exhaustively photograph the subject.

Patent Document 1 (Japanese Patent No. 2744265 (pages 5-7, and FIG. 3) describes an example of an image combining system for displaying a screen to guide a user having a camera to take a photograph such that the foregoing condition will be satisfied. The configuration of this conventional image combining system described in Patent Document 1 is illustrated in FIG. 1.

In FIG. 1, 101 designates a camera body; 102 a shutter button; 103 a display device, 104 and 105 a switch for instructing whether the camera is panned in the left-hand direction or right-hand direction; and 106 a lens for focusing a subject on a film or an imager device.

FIG. 2 illustrates an exemplary display by display device 103 of the image combining system illustrated in FIG. 1.

For example, when the camera is panned in the right-hand direction, as the right-hand direction is entered through switch 105, right side area 202 of partial image 201, which has been already photographed, is displayed in a left end area of displayed image 203. Further, left side area 205 of partial image 204 currently captured by the camera is combined in the remaining right side screen of displayed image 203 as a moving image, and the resulting image is displayed.

The user moves (pans) camera body 101 in parallel with an imaging plane, with reference to displayed image 203 on display device 103, such that right side area 202 of previously photographed partial image 201 is not discontinuous to left side area 205 of partial image 204 currently captured by the camera at the boundary therebetween, and depresses shutter button 102 to photograph the partial image. In this way, the mosaic image is generated by moving the camera toward a site of the subject not yet photographed, while including an overlapping area between the previously photographed partial image and the partial image currently captured by the camera, and sequentially photographing partial images.

However, in the conventional image combining system described in the above-mentioned Patent Document 1, the camera body must be moved in the vertical direction and horizontal direction, for example, if an image combining system is manufactured for photographing a subject which is broad in both the vertical and horizontal directions, based on the technique of Patent Document 1. Since a direction in which the camera is moved must be previously specified by the switch, a problem arises in that the operation is very complicated. Accordingly, the image combining system described in Patent Document 1 is of a configuration which is not suitable for photographing a subject which is broad in the vertical and horizontal directions.

Also, in the image combining system described in Patent Document 1, the camera body must be moved in parallel with the imaging plane, and the amount of movement must be adjusted such that a previously photographed partial image is not discontinuous to a partial image currently captured by the camera at the boundary therebetween. Thus, the user is required to perform subtle operations, causing a problem that the user experience considerable difficulty taking photographs.

DISCLOSURE OF THE INVENTION

It is therefore an object of the present invention to provide an image combining system and method which are capable of generating a mosaic image through simple operations without the need for complicated and subtle operations such as manipulations of a switch, parallel movements of a camera, alignment between partial images, and the like by the user.

To achieve the above object, in the present invention, a data processing unit calculates image conversion parameters corresponding to each partial image, geometrically converts photographed partial images on the basis of a current partial image based on the calculated image conversion parameters, and combines them to generate a mosaic image. Also, a display device displays each current partial image and at least part of the generated mosaic image.

In such a configuration, the user is not required to previously specify, with a switch, a direction in which a camera is moved, or to move the camera in parallel with an imaging plane, or to adjust a camera panning to avoid a discontinuous image at the boundary of a current partial image with a photographed partial image, as required in a conventional image combining system. Consequently, a mosaic image can be generated even for a subject which is broad in the vertical and horizontal directions, through simple manipulation, without the need for complicated manipulations or alignment by the user.

Also, in the present invention, each image conversion parameter is optimized so as to maintain the consistency of the geometric conversion and combination among all partial images. Accordingly, shifts in the combination are eliminated between partial images which were photographed at separate times, thus achieving a mosaic image with less distortion. Further, the mosaic image can be generated at a higher resolution by applying super resolution processing to each partial image.

The present invention employs, as a displayed image, an image which has a current partial image placed over the entire screen of the display device, and a mosaic image generated from photographed partial images including the current partial image displayed in a portion of the screen at a reduced scale; or an image which has a current partial image placed at the center of the screen of the display device, and photographed partial images included in a predetermined range centered around the current partial image, which are combined for display; or an image which has a current partial image placed over the entire screen of the display device, and a portion overlapping with photographed partial images displayed and highlighted.

As a result, since not only the current partial image but also at least part of the mosaic image are displayed on the display device, the user can readily confirm an area of the subject which has not been photographed, and can readily determine in which direction the camera should be next moved. Therefore, even when photographing a subject which is broad in the vertical and horizontal directions, the user will not forget to photograph part of the subject.

BRIEF DESCRIPTION OF THE DRAWINGS

FIG. 1 is a side view illustrating the configuration of a conventional image combining system.

FIG. 2 is a schematic diagram illustrating an exemplary display by the image combining system illustrated in FIG. 1.

FIG. 3 is a block diagram illustrating the configuration of a first embodiment of an image combining system of the present invention.

FIG. 4 is a flow chart illustrating a processing procedure for the image combining system illustrated in FIG. 3.

FIG. 5 is a schematic diagram illustrating a first example of a displayed image by the image combining system of the present invention.

FIG. 6 is a schematic diagram illustrating a second example of displayed images by the image combining system of the present invention.

FIG. 7 is a schematic diagram illustrating a third example of displayed images by the image combining system of the present invention.

FIG. 8 is a block diagram illustrating the configuration of a second embodiment of the image combining system of the present invention.

FIG. 9 is a flow chart illustrating a processing procedure for the image combining system illustrated in FIG. 8.

FIG. 10 is a block diagram illustrating the configuration of a third embodiment of the image combining system of the present invention.

FIG. 11 a block diagram illustrating the configuration of a fourth embodiment of the image combining system of the present invention.

FIG. 12 is a block diagram illustrating the configuration of an implementation of the image combining system of the present invention.

BEST MODE FOR CARRYING OUT THE INVENTION

Next, the present invention will be described with reference to the drawings.

First Embodiment

As illustrated in FIG. 3, an image combining system of a first embodiment comprises imager device 310 such as a still camera, a video camera or the like; data processing unit 300 for combining partial images to generate a mosaic image; and display device 320 such as a liquid crystal panel, a Braun tube or the like for displaying the result of processing by data processing unit 300. Data processing unit 300 is implemented by an LSI (Large scale Integrated Circuit), a logic circuit or the like which comprises a calculation function and a memory.

Data processing unit 300 in the first embodiment comprises conversion parameter estimation unit 301, storage unit 302, image combination data retrieval unit 303, image combination unit 304, and control unit 305.

Conversion parameter estimation unit 301 estimates the geometric conversion required for a combination of a previously photographed (preceding) partial image, among partial images photographed by imager device 310, and a partial image which is currently being photographed, and calculates image conversion parameters therefor. All the photographed partial images and the image conversion parameters calculated by conversion parameter estimation unit 301 are respectively stored in storage unit 302.

Image combination data retrieval unit 303 selects partial images required for the generation of a display image in accordance with the resolution of display device 320 or a display method (screen layout) specified by the user, and retrieves the selected partial images and image conversion parameters corresponding thereto from storage unit 302.

Image combination unit 304 geometrically converts the photographed partial image on the basis of a current partial image using the partial images and image parameters retrieved by image combination data retrieval unit 303, and combines them to generate a mosaic image. Also, image combination unit 304 generates image data for displaying an image, which includes the current partial image and at least part of the combined mosaic image, on display device 320 in accordance with the display method (screen layout) specified by the user.

Control unit 305 controls processing by respective conversion parameter estimation unit 301, storage unit 302, image combination data retrieval unit 303, and image combination unit 304.

Next, a processing procedure for the image combining system of the first embodiment will be described with reference to FIG. 3 using a flow chart of FIG. 4.

Assume in the following that the user moves imager device 310, a subject is photographed each time the shutter button is depressed or at previously set constant time intervals, and photographed partial images are sequentially supplied from imager device 310 to data processing unit 300.

As illustrated in FIG. 4, as one partial image of the subject photographed by imager device 310 is captured into data processing unit 300 (step S401), control unit 305 first accesses storage unit 302 to search whether or not there is a partial image which includes the same subject as that photographed immediately before (step S402). If there is a photographed partial image, control unit 305 estimates the geometrical conversion required for a combination of the current partial image with the partial image photographed immediately before that, using conversion parameter estimation unit 301, and calculates image conversion parameters required for the geometric conversion (step S403). Then, control unit 305 stores the current partial image and the calculated image conversion parameters in association with each other in storage unit 302 (step S404). As a method of calculating the image conversion parameters, for example, the method disclosed in the aforementioned Non-Patent Document 1 may be used.

Alternatively, external parameters of the camera may be used for the image conversion parameters. In this event, first, in an initial frame, feature points are detected on an image, and three-dimensional coordinates are determined for each feature point on the assumption that the camera is substantially opposite the subject, and the subject is a flat plane positioned at a certain distance from the camera.

In subsequent frames, external parameters of the camera are calculated using, for example, an approach disclosed in Tomokazu Sato, Masayuki Kanbara, Naokazu Yokoya, and Haruo Takemura, "Three-Dimensional Modeling of Outdoor Environment from Moving Image Utilizing Multi-Baseline Stereo Method," Technical Report, PRMU2001-233, February 2002. This approach estimates the external parameters of the camera by tracking predetermined feature points between a currently captured partial image and a partial image captured before that.

If there is no photographed partial image in the search processing at step S402, the flow proceeds to processing at step S408, returning to the processing at step S401, where the next photographed image is captured.

Subsequently, control unit 305 selects a plurality of partial images required for combination into a mosaic image using image combination data retrieval unit 303, retrieves the selected partial images and conversion. parameters corresponding thereto from storage unit 302, respectively (step S405), and transfers them to image combination unit 304.

Image combination unit 304 geometrically converts the photographed partial images on the basis of the current partial image using the partial images and image conversion parameters retrieved by image combination data retrieval unit 303, and combines them to generate a mosaic image (step S406). Image combination unit 304 also sends image data for displaying the image, including the current partial image and at least part of the generated mosaic image, to display device 320 (step S407). When the image data is generated for displaying the image, an average value or a median value is respectively calculated for each pixel positioned at the same coordinates, and these values may be used for pixel values of display device 320.

Contemplated as an image displayed on display device 320 is for example, a layout which has current partial image 901 placed over the entirety of display screen 900, and mosaic image 902, which is a combination of photographed partial images, superimposed on part of display screen 900, for example, in a lower right area at a reduced scale, as illustrated in FIG. 5.

In this event, for indicating to the user where current partial image 901 is located, the circumscribed rectangle of current partial image 903 may be highlighted within the mosaic image. Non-photographed area 904 which does not have a partial image within mosaic image 902 may be identified, for example, by setting a particular pixel value (black or the like). Also, when current partial image 903 is located outside of mosaic image 902, the entire mosaic image may be scrolled and displayed such that partial image 903 fits into mosaic image 902, or mosaic image 902 may be displayed at a further reduced scale.

Also, contemplated as a second example of an image displayed on display device 320 is a layout which has the current partial image placed at the center of the screen at all times, and photographed partial images within a predetermined range centered therearound which are displayed in combination, as illustrated in FIG. 6.

In this event, data processing unit 300 first places first partial image 1001 entered at time n at the center of screen 1000 at that time (FIG. 6(a)).

Next, data processing unit 300 places second partial image 1011 entered at time n+1 at the center of screen 1010 at that time, geometrically converts first partial image 1001 entered at time n on the basis of second partial image 1011, and arranges converted partial image 1012 in combination (FIG. 6(b)).

Similarly, data processing unit 300 places third partial image 1021 entered at time n+2 at the center of screen 1020 at that time, geometrically converts second partial image 1011 entered at time n+1 on the basis of third partial image 1021, and arranges converted partial image 1022 in combination. Further, data processing unit 300 geometrically converts first partial image 1001 (or partial image 1012) entered at time n on the basis of third partial image 1021, and arranges converted partial image 1023 in combination (FIG. 6(c)).

On the screen, the circumscribed rectangle of partial image 1001, 1011, 1021 at each time may be highlighted to indicate the current partial image to the user. Also, non-photographed area 1002, which does not have a partial image present in each screen, may be identified, for example, by setting it to a particular pixel value (black or the like).

Also, contemplated as a third example of an image displayed on display device 320 is a layout which has a current partial image placed over the entire screen, and a highlighted area which overlaps with photographed partial images, as illustrated in FIG. 7.

In this event, data processing unit 300 first places first partial image 1101 entered at time n over entire screen 1100 at that time (FIG. 7(a)).

Next, data processing unit 300 places second partial image 1111 entered at time n+1 over entire screen 1110 at that time. Further, data processing unit 300 detects overlapping area 1112 of first partial image 1101 entered at time n and second partial image 1111 from image conversion parameters therebetween, and generates an image having highlighted overlapping area 1112 (FIG. 7(b)). A method of highlighting overlapping area 1112 includes, for example, a method of changing the brightness of overlapping area 1112, a method of blending a particular color in overlapping area 1112, and the like.

Likewise, data processing unit 300 places third partial image 1121 entered at time n+2 over entire surface 1120 at that time. Further, data processing unit 300 detects overlapping area 1122 of second partial image 1111 entered at time n+1 and third partial image 1121 from image conversion parameters therebetween, and generates an image having highlighted overlap area 1122. Further, data processing unit 300 calculates an overlapping area of first partial image 1101 entered at time n with third partial image 1121 from image conversion parameters therebetween, and generates an image with the highlighted overlapping area (FIG. 7(*c*)). Here, an area in which a plurality of partial images overlap, such as overlapping area 1123, may be highlighted, for example, by performing such processing as blending with a deeper color in accordance with the number of partial images therein.

In the third exemplary displayed image illustrated in FIG. 7, a mosaic image having not only a current partial image but also partial images falling within a predetermined range centered therearound and combined thereinto, may be displayed in a portion of the screen at a reduced scale, as the displayed image illustrated in FIG. 5.

Which of a variety of the exemplary display images illustrated in FIGS. 5-7 should be displayed on display device 320 may be previously set by the user using a switch or the like, or may be switchable in the middle of photographing.

As image data is sent from image combination unit 304 to display device 320, control unit 305 determines whether or not the processing has been completed for all partial images required for combination into the mosaic image (step S408), and returns to processing at step S401 if processing has not been completed to capture the next partial image, and repeats the aforementioned processing from step S401 to step S408. Conversely, if processing has been completed for all required partial images, the mosaic image combination processing is terminated.

Next, description will be given of the effects of the first embodiment of the image combining system of the present invention.

In the image combining system of the first embodiment, the user does not make alignment between partial images, but data processing unit 300 geometrically converts partial images for combination based on image conversion parameters calculated by conversion parameter estimation unit 301, thus making it possible to generate a mosaic image through simple manipulations, without the need for complicated switch manipulations, parallel movements of the camera, alignment between partial images and the like by the user.

Also, by displaying images as illustrated in FIGS. 5-7, not only a current partial image, but also photographed partial images are also displayed in combination, so that the user can readily confirm a non-photographed area of a subject and can readily determine in which direction the camera should be moved. In this way, even when photographing a subject which is broad in the vertical and horizontal directions, the user will not forget to photograph part of the subject.

Further, since required partial images and image conversion parameters are retrieved from storage unit 302 in accordance with the resolution of display device 320 or a display image specified by the user to generate image data for the display image, the processing for displaying an image can be restrained to a minimally required amount.

Second Embodiment

Next, a second embodiment of the image combining system of the present invention will be described using the drawings.

As illustrated in FIG. 8, the image combining system of the second embodiment, like the first embodiment, comprises imager device 510 such as a still camera, a video camera or the like; data processing unit 500 for combining partial images to generate a mosaic image; and display device 520 such as a liquid crystal panel, a Braun tube or the like for displaying the result of processing by data processing unit 500. Data processing unit 500 is implemented, for example, by an LSI, a logic circuit or the like which comprises a calculation function and a memory.

Data processing unit 500 in the second embodiment comprises mosaic image generation unit 501, and overall optimization unit 502.

Mosaic image generation unit 501 comprises functions similar to those of data processing unit 300 in the first embodiment, and geometrically converts and combines photographed partial images on the basis of a current partial image to generate a mosaic image. Overall optimization unit 502 individually optimizes respective image conversion parameters so as to maintain the consistency for the results of the geometrical conversion and combination among all partial images.

As a method of optimizing image conversion parameters, the following approach is used by way of example.

First, for feature points in each partial image, all other partial images are searched for corresponding points to collect pairs of feature points. Here, an i-th pair of feature points is designated $\{x_i, x_i'\}$.

Subsequently, image conversion parameters between partial images are found to minimize the evaluation equation shown below, and are defined to be final image parameters.

$$\sum_i d^2(\hat{x}_i, x_i) + d^2(\hat{x}_i', x_i') \qquad \text{[Equation 2]}$$

where $$d(\hat{x}_i, x_i), d(\hat{x}_i', x_i') \qquad \text{(Equation 3)}$$

shows the Euclid distance:

between point $\hat{x}$ and point x or between point $\hat{x}'$ and point x' \qquad (Equation 4)

Also, a point $$\hat{x} \qquad \text{(Equation 5)}$$

indicates the position of point x, the coordinates of which are converted by the image conversion parameters.

When the image conversion parameters are used as external parameters for the camera, the image conversion parameters may be found such that they minimize the evaluation equation shown below, and they may be chosen to be final image conversion parameters.

$$\sum_f \sum_p w_p |x_{fp} - \hat{x}_{fp}| \qquad \text{[Equation 6]}$$

where f is the number of entered partial images, p is the number of tracked feature points, $x_{fp}$ is the coordinates of feature point p in an f-th frame, and $$\hat{x}_{fp} \qquad \text{(Equation 7)}$$

is the coordinate on the image of the f-th frame onto which feature point p is projected. Also, $W_p$ is a confidence level of the feature point based on a tracking error of the feature point.

For reference, a known Levenberg-Marquardt algorithm (see "Numerical Recipes in C [Japanese version] Numerical Calculation Recipes in C language," pp. 503-507, Gijutsu-Hyoron Co., Ltd, ISBN4-87408-506-1, and the like) may be used for the optimization of the image conversion parameters. In this event, values generated by mosaic image generation unit 501 may be used for initial values for the image conversion parameters corresponding to each partial image.

Next, a processing procedure for an image combining system of the second embodiment will be described with reference to FIG. 8 using a flow chart of FIG. 9.

Assume in the following that the user moves imager device 510, and a subject is photographed each time a shutter button is depressed or at previously set constant time intervals, and a photographed partial image is supplied from imager device 510 to data processing unit 500. Also, assume that the following processing by mosaic image generation unit 501 and overall optimization unit 502 is controlled by a control unit, not shown, possessed by mosaic image generation unit 501.

As illustrated in FIG. 9, as one partial image of the subject is captured from imager device 510 to data processing unit 500 (step S601), mosaic image generation unit 501 generates a mosaic image in a manner similar to the first embodiment, and delivers it to display device 520 (step S602).

Upon delivery of image data to display device 502, mosaic image generation unit 501 determines whether or not processing has been completed for all partial images required for combination into a mosaic image (step S603), and returns to processing at step S601, if processing has not been completed, to repeat processing from step S601 to step S603.

If processing has been fully completed for required partial images, overall optimization unit 502 is used to optimize each image conversion parameter to eliminate shifts in the combination between partial images which were not photographed at adjacent times (step S604).

Finally, a mosaic image is again generated by geometrically converting and combining the respective partial images using the image conversion parameters optimized in processing at step S604, and the mosaic image data is sent to display device 502 (step S605).

In the foregoing description, the overall optimization processing is executed for the image conversion parameters after mosaic image generation unit 501 has terminated geometrical conversion and combination of all partial images, however, overall optimization processing for the image conversion parameters may be executed each time geometrical conversion and combination processing have been done for a partial image, or may be executed each time the geometrical conversion and combination processing have been completed for every predetermined number of partial images. Alternatively, overall optimization processing for the image conversion parameters may be executed when a predetermined condition is satisfied, such as executed immediately before imager device 510 is largely changed in the panning direction, and the like.

Next, a description will be given of effects of the second embodiment of the image combining system of the present invention.

In the image combining system of the first embodiment, image conversion parameters are respectively calculated for partial images which were photographed at adjacent times, and the partial images are geometrically converted in sequence based on these values for combination, so that errors of the image conversion parameters may be accumulated to cause distortion in a mosaic image.

In the image conversion system of the second embodiment, since shifts in the combination are eliminated between partial images which were photographed at separate times, the resulting mosaic image can be less distorted than the first embodiment.

Third Embodiment

Next, a third embodiment of the image combining system of the present invention will be described using the drawings.

As illustrated in FIG. 10, the image combining system of the third embodiment, like the first embodiment, comprises imager device 710 such as a still camera, a video camera or the like; data processing unit 700 for combining partial images to generate a mosaic image; and display device 720 such as a liquid crystal panel, a Braun tube or the like for displaying the result of processing by data processing unit 700. Data processing unit 700 is implemented, for example, by an LSI, a logic circuit or the like which comprises a calculation function and a memory.

Data processing unit 700 of the third embodiment comprises mosaic image generation unit 701, and super resolution image generation unit 702.

Mosaic image generation unit 701, which comprises similar functions as those of data processing unit 300 in the first embodiment or data processing unit 500 in the second embodiment, geometrically converts and combines photographed partial images on the basis of a current partial image to generate a mosaic image. Also, mosaic image generation unit 701 individually optimizes respective image conversion parameters so as to maintain the consistency for the results of the geometrical conversion and combination among all partial images.

Super resolution image generation unit 702 generates a higher resolution mosaic image than the image combining system of the first embodiment or second embodiment by applying super resolution processing to photographed partial images.

As super resolution processing, the following approach may be employed, as disclosed, for example, in Irani Pelog, "Improving Resolution by Image Registration", CVGIP: Graphical Models and Image Processing, Vol. 53, pp. 231-239, 1991, or the like.

Assume now that there exist m partial images $\{g_k\}=g_1, g_2, \ldots, g_m$, and assume that f designates a high-resolution mosaic image which one wishes to generate. Also, assume that a mosaic image and image conversion parameters generated by mosaic image generation unit 702 are used for an initial image for mosaic image f, and for respective image conversion parameters between partial images $\{g_k\}$.

Super resolution image generation unit 702 first sets initial image $f^{(0)}$ for a mosaic image, and estimates a low-resolution image $(g_k^{(0)})$ corresponding to each partial image $\{g_k\}$ based on the result of simulations for the process of geometric conversion and low-resolution mosaic image generation including blurring data.

Next, super resolution image generation unit 702 calculates differential image $\{g_k - g_k^{(0)}\}$ between the estimated image and entered image, and adds pixel values of the differential image to corresponding locations in initial image $f^{(0)}$ to generate updated high-resolution mosaic image $f^{(1)}$.

This processing is repeated until error function e indicated by the following equation becomes sufficiently small.

$$e^{(n)} = \sqrt{\sum_k \sum_{(x,y)} (gk(x, y) - g_k^{(n)}(x, y))^2}$$ [Equation 8]

where n is the number of times the calculation is repeated.

A mosaic image generated by mosaic image generation unit 701 may be enlarged, for example, by a factor of two in the vertical and horizontal directions, respectively, to create an image for use as the initial image for the mosaic image, or may be enlarged by a factor equal to or larger than two for use as the initial image.

Next, a description will be given of effects of the image combining system of the third embodiment of present invention.

The image combining system of the third embodiment can provide a higher resolution mosaic image than the image combining systems of the first embodiment and second embodiment by comprising super resolution image generation unit 702.

The image combining system of the third embodiment may perform only mosaic image combination processing which imposes a relatively light processing load (a low calculation cost) while the subject is being photographed, and executes super resolution image generation processing and overall optimization processing for image conversion parameters which impose a relatively heavy processing load (a high calculation cost) after all partial images have been photographed. In this event, a mosaic image update response is prevented from becoming degraded while the subject is being photographed.

Fourth Embodiment

Next, a fourth embodiment of the image combining system of the present invention will be described using the drawings.

As illustrated in FIG. 11, the image combining system of the fourth embodiment, like the first embodiment, comprises imager device 810 such as a still camera, a video camera or the like; data processing unit 800 for combining partial images to generate a mosaic image; display device 820 such as a liquid crystal panel, a Braun tube or the like for displaying the result of processing by data processing unit 800; and recording medium 830 which records an image combination program for causing data processing unit 800 to generate a mosaic image.

The image combination program is a program for data processing unit 800 to implement processing for each conversion parameter estimation unit 301, image combination data retrieval unit 303, image combination unit 304, and control unit 305 included in the image combining system of the first embodiment. Alternatively, the image combination program is a program for data processing unit 800 to implement processing for each mosaic image generation unit 501, and overall optimization unit 502 included in the image combining system of the second embodiment. Alternatively, the image combination program is a program for data processing unit 800 to implement the processing of mosaic image generation unit 701, and super resolution image generation unit 702 included in the image combining system of the third embodiment.

Data processing unit 800 of the fourth embodiment is implemented by a computer which has, for example, a CPU, not shown; a main storage device for temporarily holding data required for processing of the CPU; an I/O unit which is an interface unit with imager device 810, display device 820, recording medium 830 and the like; and a communication device which enables data transmission/reception with a server device or the like through a network.

Recording medium 830 may be a magnetic disk, a semiconductor memory, a magnetic tape, a CD (compact disk)-ROM, a DVD (digital versatile disk), or other recording media.

Data processing unit 800 loads the main storage device with the image combination program recorded on recording medium 830, and executes processing similar to the data processing units described in the aforementioned first to third embodiments by the CPU in accordance with the image combination program. The image combination program need not be necessarily stored in recording medium 830, but may be stored, for example, in a server device or the like on a network and downloaded to the main storage unit from the server device through a network in response to a request from data processing unit 800.

Likewise, the image combining system of the fourth embodiment can produce effects similar to those of the image combining systems shown in the aforementioned first to third embodiments.

IMPLEMENTATION

Next, an implementation of the image combining system of the present invention will be described using the drawings.

This implementation is an example in which the image combining system of the third embodiment is applied to a mobile telephone system.

As illustrated in FIG. 12, the mobile telephone system to which the image combining system of the present invention is applied, comprises mobile telephone 1230, and server device 1240 connected to mobile telephone 1230 through a network.

Mobile telephone 1230 comprises CCD camera 1210 which is an imager device capable of shooting a moving image; processor 1200 which is a data processing unit; and liquid crystal panel 1220 which is a display device.

Like the data processing unit of the first embodiment, processor 1200 comprises conversion parameter estimation unit 1201, storage unit 1202, image combination data retrieval unit 1203, image combination unit 1204, and control unit 1205.

Server device 1240 in turn comprises the super resolution overall optimization unit shown in the second embodiment, the super resolution image generation unit shown in the third embodiment, and a communication device, not shown, which enables data communications with mobile telephone 1230 through a network.

Processor 1200 comprised in mobile telephone 1230 comprises a memory, and a CPU for executing processing similar to the data processing unit in the first embodiment, for example, in accordance with the image combination program. Server device 1240 in turn comprises a memory, and a CPU for executing processing for each aforementioned overall optimization unit 1241 and super resolution image generation unit 1242 in accordance with a program.

In the mobile telephone system of this implementation, as the user moves mobile telephone 1230 while capturing a subject with CCD camera 1210, partial images of the subject photographed by CCD camera 1210 are applied to processor 1200 at previously set constant time intervals.

As one partial image of the subject is captured, processor 1200 searches storage unit 1202 to see whether or not there is a partial image that includes the same subject which was photographed immediately before. If no partial image is found, the next photographed partial image is captured. Alternatively, if there is a photographed partial image, processor 1200 estimates the geometrical conversion required for a combination of the current partial image with the partial image photographed immediately before that in accordance with the approach disclosed in the aforementioned Non-Patent Document 1, and calculates image conversion parameters therefor. Then, the current partial image and calculated image conversion parameters are accumulated in association with each other in storage unit 1202.

Next, processor 1200 selects a plurality of partial images required for combination into a mosaic image, and retrieves the selected partial images and image conversion parameters corresponding thereto. In this implementation, assume that the second exemplary display image illustrated in FIG. 6 is displayed on crystal panel 1220. In this event, processor 1200 retrieves partial images located within a predetermined range centered around the current partial image and image conversion parameters corresponding thereto from storage unit 1202.

Processor 1200 generates a mosaic image using the retrieved partial images and image conversion parameters, and displays the second exemplary display image including the mosaic image on liquid crystal panel 1220. Then, it is determined whether or not processing has been completed for all partial images required for combination into the mosaic image, and if processing has not been completed, processor 1200 retrieves the next image and repeats the processing described above. Conversely, if processing has been completed for all required partial images, processor 1200 transmits all the partial images and image conversion parameters corresponding thereto, as well as a request for processing the mosaic image (whether or not the overall optimization and super resolution processing are required) to server device 1240 through a network.

Upon receipt of the partial images and image conversion parameters from mobile telephone 1230, server device 1240, in response to a processing request from the user, optimizes all the image conversion parameters so as to maintain consistency after combination into the mosaic image by overall optimization unit 1241 in a manner similar to the second embodiment, and transmits the optimized image conversion parameters to mobile telephone 1230. In this event, mobile telephone 1230 again combines a mosaic image using the image conversion parameters received from the server device, and displays it on display device 1220.

Also, upon receipt of the partial images and image conversion parameters from mobile telephone 1230, server device 1240, in response to the processing request from the user, executes super resolution processing for each partial image by super resolution image generation unit 1242 in a manner similar to the third embodiment to generate a high resolution mosaic image, and transmits the mosaic image to mobile telephone 1230. In this event, mobile telephone 1230 displays the high resolution mosaic image received from the server device on display device 1220.

According to the mobile telephone system of this implementation, a mosaic image having a wide viewing angle and a high definition can be generated using a low resolution camera equipped in mobile telephone 1230.

The invention claimed is:

1. An image combining system comprising:
   an imager device for dividing a subject into a plurality of partial images, and photographing the partial images;
   a conversion parameter estimation unit for estimating a geometric conversion required for a combination between the partial images, and calculating image conversion parameters for the geometric conversion;
   a storage unit for storing the partial images and the calculated image conversion parameters corresponding to the partial images;
   an image combination data retrieval unit for selecting partial images required for generating a mosaic image, and retrieving the selected partial images and image conversion parameters corresponding thereto from said storage unit, respectively;
   an image combination unit for geometrically converting photographed partial images on the basis of a current partial image using the partial images and image conversion parameters retrieved by said image combination data retrieval unit, combining them to generate a mosaic image, and generating image data for displaying the current partial image and at least part of the mosaic image; and
   a display device for displaying an image in accordance with the image data generated by said image combination unit.

2. The image combining system according to claim 1, further comprising an overall optimization unit for optimizing each image conversion parameter so as to maintain the consistency of the geometrical conversion and combination among all the partial images.

3. The image combining system according to claim 1, further comprising a super resolution image generation unit for generating an image at a resolution higher than the mosaic image.

4. The image combining system according to claim 1, wherein said image combination unit generates image data for placing the current partial image over the entire screen of said display device, and displaying a mosaic image generated from the current partial image and the photographed partial images in a portion of the screen at a reduced scale.

5. The image combining system according to claim 4, wherein said image combination unit generates image data for scrolling and displaying the mosaic image, or displaying the same at a reduced scale when the current partial image is positioned outside the mosaic image, such that the current partial image fits in the mosaic image.

6. The image combining system according to claim 1, wherein said image combination unit generates image data for placing the current partial image at the center of the screen of said display device, and displaying a combination of the photographed partial images included in a predetermined range centered around the current partial image.

7. The image combining system according to claim 1, wherein said image combination unit generates image data for placing the current partial image over the entire screen of said display device, and displaying and highlighting a portion overlapping with the photographed partial images.

8. The image combining system according to claim 7, wherein said image combination unit generates image data for displaying the overlapping portion with the photographed partial images in a color which is varied in accordance with the number of overlapping partial images.

9. An image combining method for combining a plurality of partial images separated from a subject and photographed by an imager device to generate a mosaic image for display on a display device, said method comprising:
   estimating a geometric conversion required for a combination between the partial images, and calculating image conversion parameters for the geometric conversion;

accumulating the partial images and the image conversion parameters calculated in correspondence to the partial images in a storage unit, respectively;

selecting partial images required to generate a mosaic image, and retrieving the selected partial images and image conversion parameters corresponding thereto from said storage unit;

geometrically converting photographed partial images on the basis of the current partial image using the retrieved partial images and image conversion parameters, and combining them to generate a mosaic image; and generating image data for displaying the current partial image and at least part of the mosaic image on said display device.

10. The image combining method according to claim 9, further comprising executing overall optimization processing for optimizing each image conversion parameter so as to maintain the consistency of the geometrical conversion and combination among all the partial images.

11. The image combining method according to claim 9, further comprising executing super resolution image generation processing for generating an image at a resolution higher than the mosaic image.

12. The image combining method according to claim 9, comprising:

generating image data for placing the current partial image over the entire screen of said display device, and displaying a mosaic image generated from the current partial image and the photographed partial images in a portion of the screen at a reduced scale.

13. The image combining method according to claim 12, comprising:

generating image data for scrolling and displaying the mosaic image, or displaying the same at a reduced scale when the current partial image is positioned outside the mosaic image, such that the current partial image fits in the mosaic image.

14. The image combining method according to claim 9, comprising:

generating image data for placing the current partial image at the center of the screen of said display device, and for displaying a combination of the photographed partial images included in a predetermined range centered around the current partial image.

15. The image combining method according to claim 9, comprising:

generating image data for placing the current partial image over the entire screen of said display device, and displaying and highlighting a portion overlapping with the photographed partial images.

16. The image combining method according to claim 15, comprising:

generating image data for displaying the overlapping portion with the photographed partial images in a color which is varied in accordance with the number of overlapping partial images.

17. A program for causing a computer to execute processing for combining a plurality of partial images separated from a subject and photographed by an imager device to generate a mosaic image for display on a display device, said program causing the computer to execute:

processing for estimating a geometric conversion required for a combination of the partial images, and calculating image conversion parameters for the geometric conversion;

processing for accumulating the partial images and the image conversion parameters calculated in correspondence to the partial images in a storage unit, respectively;

processing for selecting partial images required to generate a mosaic image, and retrieving the selected partial images and image conversion parameters corresponding thereto from said storage unit;

processing for geometrically converting photographed partial images on the basis of the current partial image using the retrieved partial images and image conversion parameters, and combining them to generate a mosaic image; and processing for generating image data for displaying the current partial image and at least part of the mosaic image on said display device.

18. The program according to claim 17, further causing the computer to execute overall optimization processing for optimizing each image conversion parameter so as to maintain the consistency of the geometrical conversion and combination among all the partial images.

19. The program according to claim 17, further causing the computer to execute super resolution image generation processing for generating an image at a resolution higher than the mosaic image.

20. The program according to claim 17, causing the computer to execute processing for generating image data for placing the current partial image over the entire screen of said display device, and displaying a mosaic image generated from the current partial image and from the photographed partial images in a portion of the screen at a reduced scale.

21. The program according to claim 20, causing the computer to execute processing for generating image data for scrolling and displaying the mosaic image, or displaying the same at a reduced scale when the current partial image is positioned outside the mosaic image, such that the current partial image fits in the mosaic image.

22. The program according to claim 17, causing the computer to execute processing for generating image data for placing the current partial image at the center of the screen of said display device, and displaying a combination of the photographed partial images included in a predetermined range centered around the current partial image.

23. The program according to claim 17, causing the computer to execute processing for generating image data for placing the current partial image over the entire screen of said display device, and displaying and highlighting a portion overlapping with the photographed partial images.

24. The program according to claim 23, causing the computer to execute processing for generating image data for displaying the overlapping portion with the photographed partial images in a color which is varied in accordance with the number of overlapping partial images.

* * * * *